(12) United States Patent
Debates et al.

(10) Patent No.: US 9,613,336 B2
(45) Date of Patent: Apr. 4, 2017

(54) RFID LOGIC TAG

(71) Applicant: Motorola Mobility LLC, Chicago, IL (US)

(72) Inventors: Scott Debates, Crystal Lake, IL (US); Francis Forest, Chicago, IL (US); Mary Hor-Lao, Chicago, IL (US); Douglas A. Lautner, Round Lake, IL (US); Jagatkumar Shah, Lake in the Hills, IL (US); Hong Zhao, Naperville, IL (US)

(73) Assignee: Motorola Mobility LLC, Chicago, IL (US)

(*) Notice: Subject to any disclaimer, the term of this patent is extended or adjusted under 35 U.S.C. 154(b) by 73 days.

(21) Appl. No.: 14/734,501

(22) Filed: Jun. 9, 2015

(65) Prior Publication Data

US 2016/0364680 A1 Dec. 15, 2016

(51) Int. Cl.
*G06Q 10/08* (2012.01)
*G06K 7/00* (2006.01)

(52) U.S. Cl.
CPC ......... *G06Q 10/087* (2013.01); *G06K 7/0008* (2013.01)

(58) Field of Classification Search
CPC ............ G06K 7/0008; G06K 19/0723; G06K 7/10366; G06K 19/0717; G06K 19/07749; G06K 17/00; G06K 7/10118
USPC ...................................................... 340/10.41
See application file for complete search history.

(56) References Cited

U.S. PATENT DOCUMENTS

| | | | |
|---|---|---|---|
| 7,413,124 B2* | 8/2008 | Frank | G06Q 10/087 235/451 |
| 8,334,775 B2* | 12/2012 | Tapp | G08B 13/19697 235/375 |
| 8,502,674 B1* | 8/2013 | Cole | G08B 21/0227 340/568.1 |
| 9,117,128 B2* | 8/2015 | Mats | G06K 7/10366 |
| 9,418,263 B2* | 8/2016 | Butler | H04L 67/1097 |

* cited by examiner

*Primary Examiner* — Mark Blouin (57) ABSTRACT

In embodiments of RFID logic tag, a radio-frequency identification (RFID) logic tag can interrogate multiple RFID tags, such as a first RFID tag that monitors the status of a first item, as well as a second RFID tag that monitors the status of a second item. The RFID logic tag receives status data as responses from the respective first and second RFID tags (and optionally, additional RFID tags). The RFID logic tag is implemented to then generate a logic signal based on a logic operation applied to the status data received from the RFID tags.

20 Claims, 4 Drawing Sheets

RFID LOGIC TAG

BACKGROUND

Radio-frequency identification (RFID) tags are small electronic tags or labels that can be programmed with identifying data or other information. An RFID reader can transmit an interrogation signal as a broadcast message requesting RFID tags that are in range to return the identifying data or information that the RFID tags have stored. The RIFD tags can then wirelessly communicate the data information to the RFID reader via a radio frequency (RF) communication channel.

As production costs decrease, RFID tags are cheaper to implement and have become more common, such as for product inventory control and tracking, as well as for many other usage scenarios. For example, an inventory product code, such as a stock-keeping unit (SKU) or universal product code (UPC) may be stored by an RFID tag to track inventory in a warehouse or to facilitate customer check-out in a store. RFID tags can therefore be used instead of bar codes, which are visual identifiers that necessitate line-of-sight to be acquired by a bar code reader. RFID tags, in contrast, do not require a line-of-sight view for RFID readers to acquire information that is stored on the RFID tags.

BRIEF DESCRIPTION OF THE DRAWINGS

Embodiments of an RFID logic tag are described with reference to the following Figures. The same numbers may be used throughout to reference like features and components that are shown in the Figures.

DETAILED DESCRIPTION

Embodiments of a radio-frequency identification (RFID) logic tag are described, and an RFID logic tag can be implemented to operate as a logic gate that reads other RFID tags and generates a logic signal based on responses from the other RFID tags. The RFID logic tag can interrogate multiple RFID tags, such as a first RFID tag that monitors the status of a first item, as well as a second RFID tag that monitors the status of a second item. The RFID logic tag receives status data as responses from the respective RFID tags (and optionally, additional RFID tags). The RFID logic tag includes a logic module that is implemented to then generate a logic signal (e.g., a new logic state) based on a logic operation applied to the status data received from the RFID tags.

In aspects of an RFID logic tag, the logic module of the RFID logic tag can generate the logic signal based on an AND function of the status data received from other RFID tags, or based on an OR function of the status data received from the other RFID tags. A logic signal generated based on an AND function of the status data can indicate that a quantity of the respective items that are monitored by the RFID tags is available, or is not available. Similarly, a logic signal generated based on an AND function of the status data can indicate that a configuration of the respective items is acceptable, or is not acceptable. Alternatively, a logic signal generated based on an OR function of the status data can indicate that a quantity of the respective items that are monitored by the RFID tags is available, or that the quantity of at least one of the items is not available. Similarly, the logic signal generated based on an OR function of the status data can indicate that a configuration of the respective items is acceptable, or that the configuration of at least one of the items is not acceptable.

While features and concepts of an RFID logic tag can be implemented in any number of different devices, systems, environments, and/or configurations, embodiments of an RFID logic tag are described in the context of the following example devices, systems, and methods.

Figure 1:
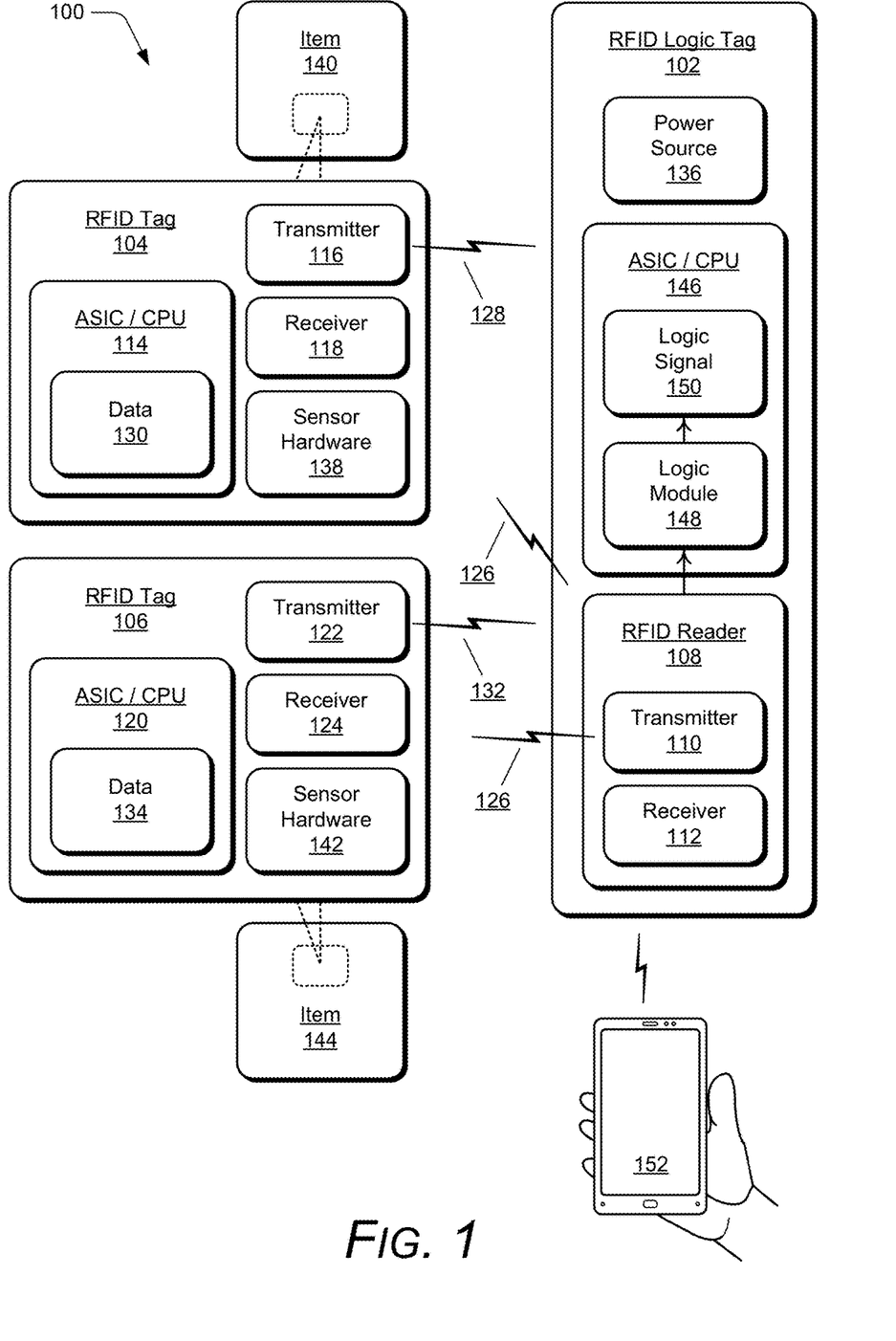
FIG. 1 illustrates an example system in which embodiments of an RFID logic tag can be implemented.
Figure 2:
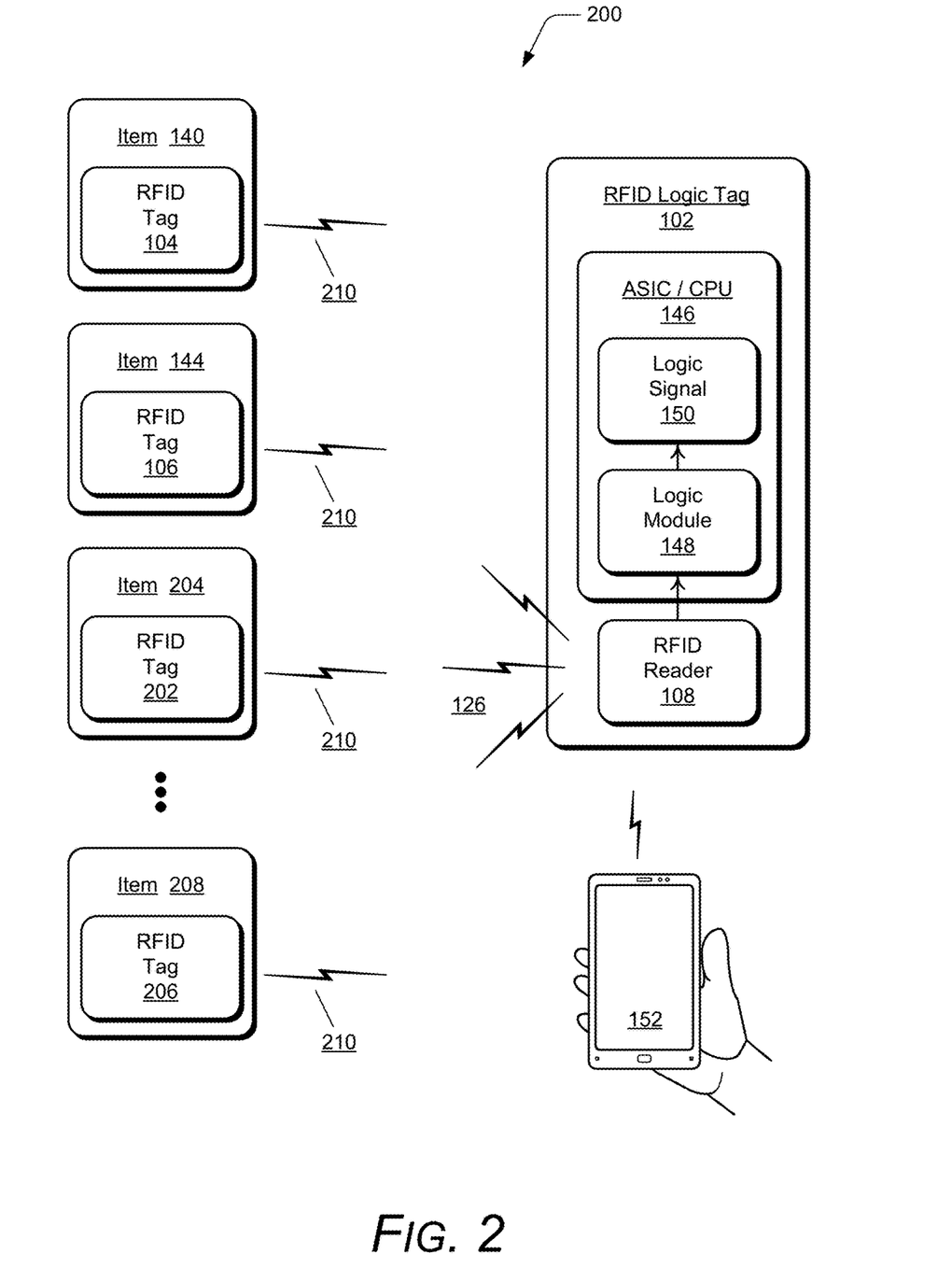
FIG. 2 further illustrates the example system in which embodiments of an RFID logic tag can be implemented.

FIG. 1 illustrates an example system 100 in which embodiments of a radio-frequency identification (RFID) logic tag can be implemented. The example system 100 includes an RFID logic tag 102, as well as any number of other RFID tags, such as a first RFID tag 104 and a second RFID tag 106. Although only the two RFID tags 104 and 106 are shown and described with reference to the example system 100, the system can include any number of RFID tags that are interrogated by the RFID logic tag 102 for a response, such as generally shown in FIG. 2. An RFID tag may also be commonly referred to as a "label" in some implementations. The RFID tags 104 and 106 may be any type of passive or active RFID tags, such as an active tag that includes a battery or other power source. Alternatively, various passive RFID tags are smaller and cheaper without a battery, and are activated when radio energy is transmitted by an RFID reader to activate a passive tag. The RFID logic tag 102 includes an example of an RFID reader 108 that is implemented with a transmitter 110 and a receiver 112 (or may be implemented as a transceiver) for two-way communication with the passive RFID tags 104 and 106 that are activated in the presence of the RFID reader 108 to perform as a passive transponder, communicating sensor data to the RFID logic tag 102.

The first RFID tag 104 includes an ASIC/CPU module 114, as well as a transmitter 116 and a receiver 118 (or may be implemented as a transceiver) for two-way communication with the RFID reader 108 of the RFID logic tag 102. Similarly, the second RFID tag 106 includes an ASIC/CPU module 120, as well as a transmitter 122 and a receiver 124 (or may be implemented as a transceiver) for two-way communication with the RFID reader 108 of the RFID logic tag 102. In implementations, the RFID reader 108 can wirelessly transmit an interrogation signal 126 to one or more in-range RFID tags, such as the first RFID tag 104 and the second RFID tag 106. The RFID tags receive the interrogation signal 126, which effectively requests the RFID tags to provide data or information wirelessly.

A request of an interrogation signal may designate particular information that is desired, or may request information generally from the RFID tags. In response to receipt of the interrogation signal 126, the ASIC/CPU module 114 of the first RFID tag 104 formulates a response 128 that may include data 130 from the RFID tag, and the response 128 is wirelessly transmitted to the RFID logic tag 102. Similarly, the ASIC/CPU module 120 of the second RFID tag 106 formulates a response 132 that may include data 134 from the RFID tag, and the response 132 is also wirelessly transmitted to the RFID logic tag 102. Each of the RFID tags also includes an antenna as shown and described with reference to FIG. 2 and the schematic diagram of an example RFID tag. The RFID tag data can be stored in non-volatile memory, and an ASIC/CPU module can be implemented as fixed or programmable logic for processing the RFID tag data, as well as modulating and demodulating the RF signals.

The RFID reader 108 of the RFID logic tag 102 receives the response signals from the respective RFID tags, and the response signals can include the data from the respective RFID tags. The response signal and data received by the RFID logic tag 102 from other RFID tags, such as from the first RFID tag 104 and the second RFID tag 106, can include information that an RFID tag is storing, has obtained, is producing, and so forth. Further, the response signal and data received from an RFID tag can include identification information, such as a code or an alphanumeric value, a parameter derived from a sensor including a sensor value, a parameter derived from a timer including a time value, a descriptive indication, or some combination thereof.

The RFID interrogation signal 126 from the RFID reader 108 of the RFID logic tag 102, and the response signals from the respective RFID tags 104 and 106 can be communicated using low frequency (LF), high frequency (HF), or ultra-high frequency (UHF) radio waves. The RFID tags in an RFID system may be passive or active. An active RFID tag, such as the RFID logic tag 102 in this example system 100, can include or otherwise have access to an independent power source 136, such as a battery or comparable device. A passive RFID tag, such as the first RFID tag 104 and the second RFID tag 106 in this example system 100, derive energy from the interrogation signal 126, which enables the RFID tags to generate and communicate back a response signal. Although not explicitly shown, a passive RFID tag may also include a capacitor or a small battery to temporarily collect and retain some of the energy derived from an interrogation signal to power IC processing and/or generate a responsive signal transmission.

Alternative or hybrid RFID systems may also be implemented. Examples of other RFID systems include, but are not limited to, a passive reader active tag (PRAT) system that has a passive reader which receives radio signals from active tags (e.g., battery operated transmit only tags), an active reader passive tag (ARPT) system that has an active reader which transmits interrogation signals and also receives reply signals from passive tags, an active reader active tag (ARAT) system that uses active tags awoken or prompted by an interrogation signal sent from an active reader, a powered but passive tag system that has a powered passive tag (e.g., a battery-assisted passive (BAP) tag) that uses stored charge in a battery or capacitor to power continuous or repeated sensor reading and processing but awaits receipt of an interrogation signal before providing sensed values, or some combination thereof.

In this example system 100, the first RFID tag 104 includes sensor hardware 138 and is implemented for status monitoring of a first item 140. Similarly, the second RFID tag 106 includes sensor hardware 142 and is implemented for status monitoring of a second item 144. The items 140 and 144 may be monitored by the sensor hardware of the RFID tags for a quantity of the respective first and second items, or may be monitored by the sensor hardware of the RFID tags for a configuration of the respective first and second items. For example, the quantity and/or configuration of an item may represent the quantity of a food item, the quantity of a medical supply, the quantity or configuration of an automotive part, the quantity or configuration of any inventoried item, and any other of the many possible item configurations and quantity. The quantity of an item may be monitored in-part by a weight sensor that is integrated in an RFID tag. Alternatively or in addition, an RFID tag may include a timer that is implemented to track the date and/or time, such as for perishable items. An example of an RFID tag that includes a weight sensor and a timer is shown and further described with reference to FIG. 3.

In the example system 100, the RFID logic tag 102 includes an ASIC/CPU module 146 that implements a logic module 148, which may be software (e.g., executable instructions), fixed logic circuitry, or a combination thereof. In embodiments, the RFID logic tag 102 can initiate an interrogation (e.g., with interrogation signal 126) of the first RFID tag 104 and the second RFID tag 106 from the RFID reader 108, which then receives status data as the responses 128 and 132 from the respective first and second RFID tags. The logic module 148 of the RFID logic tag 102 can then generate a logic signal 150 based on a logic operation applied to the status data from the first and second RFID tags. For example, the logic operation applied by the logic module 148 may be an AND function of the status data, or as an OR function of the status data received from the RFID tags.

The signal response 128 from the first RFID tag 104 can include the data 130 that indicates a configuration and/or quantity of the first item 140 that is monitored by the first RFID tag. Similarly, the signal response 132 from the second RFID tag 106 can include the data 134 that indicates a configuration and/or quantity of the second item 144 that is monitored by the second RFID tag. As noted above, although only the two RFID tags 104 and 106 are shown and described with reference to example system 100, the system can include any number of RFID tags that are interrogated by the RFID reader 108 of the RFID logic tag 102 for a response that includes data indicating a configuration and/or quantity of additional items, as generally shown and described with reference to FIG. 2.

In embodiments, the logic signal 150 that is generated by the logic module 148 based on an AND function of the status data can indicate that a quantity of the first and second items 140 and 144 is available, or is not available. Alternatively, the logic signal 150 that is generated based on an AND function can indicate that a configuration of the first and second items is acceptable, or is not acceptable. In alternate embodiments, the logic signal 150 that is generated by the logic module 148 based on an OR function of the status data can indicate that a quantity of the first or second items is available, or that the quantity of both the first and second items is not available. Alternatively, the logic signal 150 that is generated based on an OR function can indicate that a configuration of the first or second items is acceptable, or that the configuration of both the first and second items is not acceptable.

In an example usage scenario, the items 140 and 144 that are monitored by the respective RFID tags 104 and 106 may be food items, such as stocked in a refrigerator. A user may be using a mobile device 152, such as a mobile phone, tablet device, or other portable computing device, to review a recipe that indicates needing two eggs, one cup of milk, and other ingredients. The mobile device 152 can include an RFID reader to energize the RFID logic tag 102 in the refrigerator, and request a quantity status of the ingredients. The RFID reader 108 of the RFID logic tag 102 can then initiate the interrogation signal 126, which is received by the first RFID tag 104 that monitors a quantity of the first item 140 (e.g., the eggs) and which is received by the second RFID tag 106 that monitors a quantity of the second item 144 (e.g., the milk).

The first RFID tag 104 can analyze the eggs, such as by weight, and report back the data 130 as a logic one if the quantity of eggs is at least two, otherwise a logic zero. Similarly, the second RFID tag 106 can analyze the milk, such as by weight, and report back the data 134 as a logic one if the quantity of milk is at least one cup, otherwise logic zero. The logic module 148 can then apply an AND logic operation in this case to generate the logic signal 150 based on the logic responses received from the first and second RFID tags. The RFID logic tag 102 operates as a logic gate and can communicate the logic signal 150 as a logic one back to the mobile device 152, indicating that both of the recipe ingredients are available, and the mobile device can display this information for the user. Alternatively, the RFID logic tag 102 can communicate the logic signal 150 as a logic zero back to the mobile device 152, indicating that one or both of the recipe ingredients are not available, and the mobile device can display this information for the user.

In other example usage scenarios, the items 140 and 144 that are monitored by the respective RFID tags 104 and 106 may be medical supplies that are inventoried in a medical or surgical room prior to a medical procedure. Further, some of the medical supplies may be monitored for not only quantity, such as with a weight sensor of an RFID tag, but also monitored with a timer of an RFID tag to track the date and/or time of perishable items, such as medicines that are stocked for procedures. Alternatively, the items 140 and 144 that are monitored by the respective RFID tags 104 and 106 may be automotive parts that are stocked and inventoried by an automotive retailer. A customer may request all of the parts to rebuild an engine, where not only a particular quantity of the parts are needed, but also the correct configurations of the parts for the particular model year and brand of the engine rebuild.

As noted above, the RFID tags, such as the first RFID tag 104 and the second RFID tag 106, can be implemented for status monitoring of a quantity of respective items, and the logic module 148 of the RFID logic tag 102 can generate the logic signal 150 as an indication that a quantity of the items at least meets a threshold, or as an indication that the quantity of at least one of the items does not meet the threshold. Alternatively, the RFID tags can be implemented for status monitoring of a configuration of the respective items, and the logic module 148 of the RFID logic tag 102 can generate the logic signal 150 as an indication that the configuration of the respective items is acceptable, or as an indication that the configuration of at least one of the items is not acceptable. The RFID logic tag 102 in the system 100 is an example of an RFID logic device having the RFID reader 108 and the logic module 148. In alternate implementations, an RFID logic device may be a mobile phone, tablet device, or other portable device that includes an RFID reader and logic module implemented to interrogate RFID tags, such as the first RFID tag 104 and the second RFID tag 106, receive the status data from the RFID tags, and generate the logic signal 150 based on logic operation that is applied to the status data.

FIG. 2 further illustrates an example system 200 in which embodiments of the RFID logic tag 102 can be implemented. The example system 200 further illustrates the system 100 shown and described in FIG. 1, to include the RFID logic tag 102 along with the first and second RFID tags 104 and 106. The RFID logic tag 102 includes the RFID reader 108 that wirelessly transmits the interrogation signal 126 to any number of one or more in-range RFID tags that are implemented for status monitoring of the items. For example, the first RFID tag 104 monitors the first item 140, the second RFID tag 106 monitors the second item 144, an RFID tag 202 monitors an item 204, and etc. (as indicated by an RFID tag 206 that monitors an item 208). The RFID reader 108 of the RFID logic tag 102 can receive the transmitted responses 210 from any number of the RFID tags that are implemented for the status monitoring of the items. The logic module 148 of the RFID logic tag 102 can then apply a logic operation and generate the logic signal 150 based on the status data that is received from any number of the RFID tags as part of the transmitted responses 210.

In alternate configurations of the example system 200, any one or more of the RFID tags that are implemented for status monitoring of the respective items may also be implemented as a RFID logic tag. For example, the RFID tag 202 may be implemented as an additional RFID logic tag, as shown and described with reference to the RFID logic tag 102. In this example, the additional RFID logic tag can receive a data response from the RFID tag 206, apply a logic operation to its own monitored data and the received data response, and generate a logic signal that is then transmitted as one of the responses 210 to the RFID logic tag 102. Similarly, any of the RFID logic tags may also have its own RFID tag. The RFID logic tag 102, for example, can then apply the logic operation to its own tag data result and the received data responses, and generate the logic signal 150 based on the received status data and its own RFID tag data.

Figure 3:
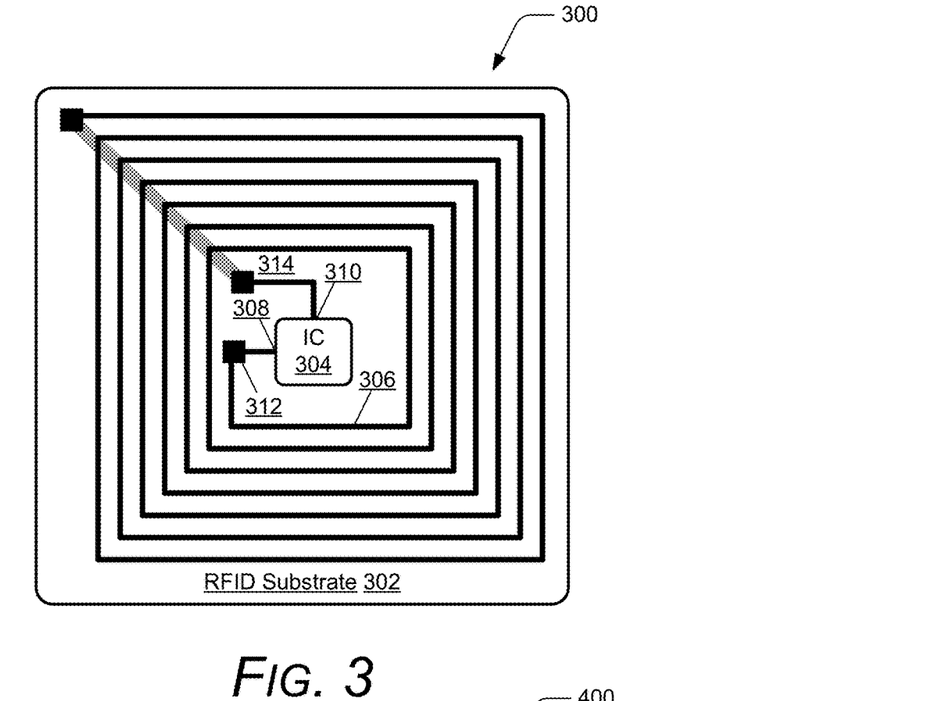
FIG. 3 illustrates example of an RFID tag that may be implemented as any of the described RFID tags in accordance with one or more embodiments.

FIG. 3 illustrates an example of an RFID tag 300 in which embodiments of an RFID logic tag can be implemented. The example RFID tag 300 may be implemented as any of the RFID tags described herein, to include the RFID logic tag 102, as well as the first RFID tag 104 and the second RFID tag 106 shown and described with reference to FIG. 1. The example RFID tag 300 may also be implemented as the RFID tag that is shown and described with reference to FIG. 4. The example RFID tag 300 is shown as a schematic diagram, and includes an RFID substrate 302, which may be paper, plastic (e.g., flexible or rigid), wood, glass, ceramic, a printed circuit board (PCB), or some combination thereof. The RFID substrate 302 forms a foundation or framework of a supporting structure for the RFID tag.

The RFID substrate 302 includes or at least supports an integrated circuit (IC) 304 and an antenna 306 that enables the IC 304 to transmit and receive wireless radio signals. The IC 304 is an example of the ASIC/CPU module 114 of the first RFID tag 104, and is also an example of the ASIC/CPU module 120 of the second RFID tag 106. The IC 304 includes a first antenna terminal 306 and a second antenna terminal 308. The antenna 306 includes a first antenna end 312 and a second antenna end 314. The first antenna end 312 or the second antenna end 314 may be considered an antenna loop in, and the other end may be considered an antenna loop out. The first antenna terminal 308 of the IC 304 is coupled to the first antenna end 312 of the antenna 306, and the second antenna terminal 310 of the IC 304 is coupled to the second antenna end 314 of the antenna 306.

The IC 304 may be implemented using any of one or more processors (e.g., a microprocessor, a controller, a computing core, or a combination thereof) or processing systems with storage memory having processor-executable instructions that are fixed, hardware-encoded, alterable, programmable, wirelessly-receivable, or a combination thereof. The IC 304 can be implemented as an application-specific integrated circuit (ASIC), a field-programmable gate array (FPGA), a complex programmable logic device (CPLD), an application-specific standard product (ASSP), a system on-a-chip (SoC), a silicon-based processing unit, or as some combination thereof. Generally, an integrated circuit can be designed with hardware along with one or more of software, firmware, or fixed logic circuitry that is implemented in connection with processing or control circuits.

The RFID tag 300 may further include processor-accessible storage memory (not explicitly shown) that is integrated with or discrete from the IC 304. The storage memory enables persistent storage of data and processor-executable instructions (e.g., software applications, programs, functions, hard-coded operations, or a combination thereof). The storage memory can include various implementations of random access memory (RAM), read only memory (ROM), flash memory, or other types of storage media in various memory device configurations. Although not specifically indicated in FIG. 3, the RFID tag 300 may further include an interconnect (e.g., a bus or other data transfer mechanism with traces, wires, buffers, etc.) that couples components of the RFID tag 300 to each other. The RFID tag 300 may also include a power source, such as a single-use battery, a battery that is rechargeable by wire or wirelessly, a capacitor, a combination thereof, and so forth.

The RFID tags may be produced in many different shapes, sizes, form factors, and materials. The RFID substrate 302 of the RFID tag 300 can be adhered to another object, such as a shipping or product label; may be incorporated into another object, such as packaging material or a medical implement; may comprise an object having another purpose, such as for storage or shipping; and so forth. For example, the RFID substrate 302, or the IC 304 and the associated antenna 306, may form part of a cardboard shipping box or may be adhered to an underside of a milk container. Moreover, the RFID tag 300 may be exposed or visible, or the RFID tag may be enclosed within or encapsulated by another material or object.

Figure 4:
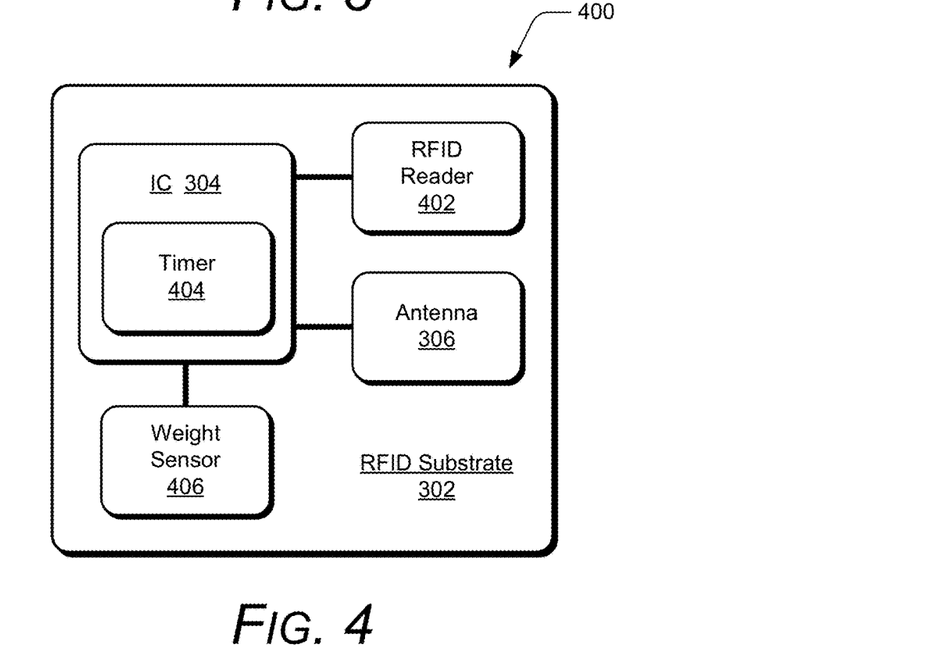
FIG. 4 illustrates another example of an RFID tag that may be implemented as any of the described RFID tags in accordance with one or more embodiments.

FIG. 4 illustrates another example of an RFID tag 400 in which embodiments of RFID logic tag can be implemented. The example RFID tag 400 may be implemented as any of the RFID tags described herein, such as the RFID logic tag 102, as well as the first RFID tag 104 and the second RFID tag 106 shown and described with reference to FIG. 1. Similar to RFID tag 300, this example RFID tag 400 includes the RFID substrate 302, the IC 304, and the antenna 306. The RFID tag 400 also includes an RFID reader 402 that can be implemented with a transmitter and a receiver (or may be implemented as a transceiver) for two-way communication with other RFID tags. The RFID tag 400 also includes a timer 404 and/or a weight sensor 406. In this example, the timer 404 is shown integrated with the IC 304, and the weight sensor 406 is shown being coupled thereto, although the timer 404 or the weight sensor 406 may be integrated with or discrete from the IC 304.

In implementations, the timer 404 can keep track of real-world clock time (or time and date) once programmed with a current time or date, may track elapsed time once started, may track countdown time once started, or a combination thereof. Time tracking, such as counting upward for elapsed time or downward toward an expiration time, may be started as part of a manufacturing process of the RFID tag 400, may be started in response to a received interrogation signal (that may include an instruction or command to start the timer), or some combination thereof.

The timer 404 may include a time value that affects if or how the IC 304 may respond to an interrogation signal, such as based on a parameter that is derived from a time value of the timer. Examples of a timer parameter include a current value of the timer, an alert that depends on a time value, an expiration indication, a difference between a current time value and a perishable period, or some combination thereof. For example, the IC 304 may report a current time value in response to an interrogation signal, may respond if a time value is changing (i.e., if the timer 404 has been started), may respond with an alert if a certain amount of time has transpired (e.g., if a countdown timer has expired or if a count-up timer reaches a threshold level), or some combination thereof.

In implementations, the weight sensor 406 can measure and/or detect a weight of an item to which the RFID tag 400 is secured and output an indication of the detected weight based on a parameter that is derived from a weight value. Examples of a weight parameter include a current value of the weight sensor, a notification that depends on a current weight value, a difference between a current weight value and an original or first weight value, an indication of time remaining until product weight becomes negligible (e.g., based on a rate of reduction of weight), or some combination thereof. The IC 304 can be programmed or designed to track changes in the weight of an item over time, or to at least provide a weight value representative of a current weight. For example, the RFID tag 400 can transmit an indication of remaining product (e.g., milk, eggs, inventory, pills, or liquid medicine) in a package with which it is associated, such as being incorporated into or adhered to the packaging. Example indications of remaining product may include values representative of ounces, percentage remaining or used, a full indication, one-quarter consumed, product not needed currently, more product needed, an integer quantity used or remaining, an expected time period until a remaining product is consumed based on a historical rate of consumption, and the like.

Example method 500 is described with reference to FIG. 5 in accordance with implementations of an RFID logic tag. Generally, any components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
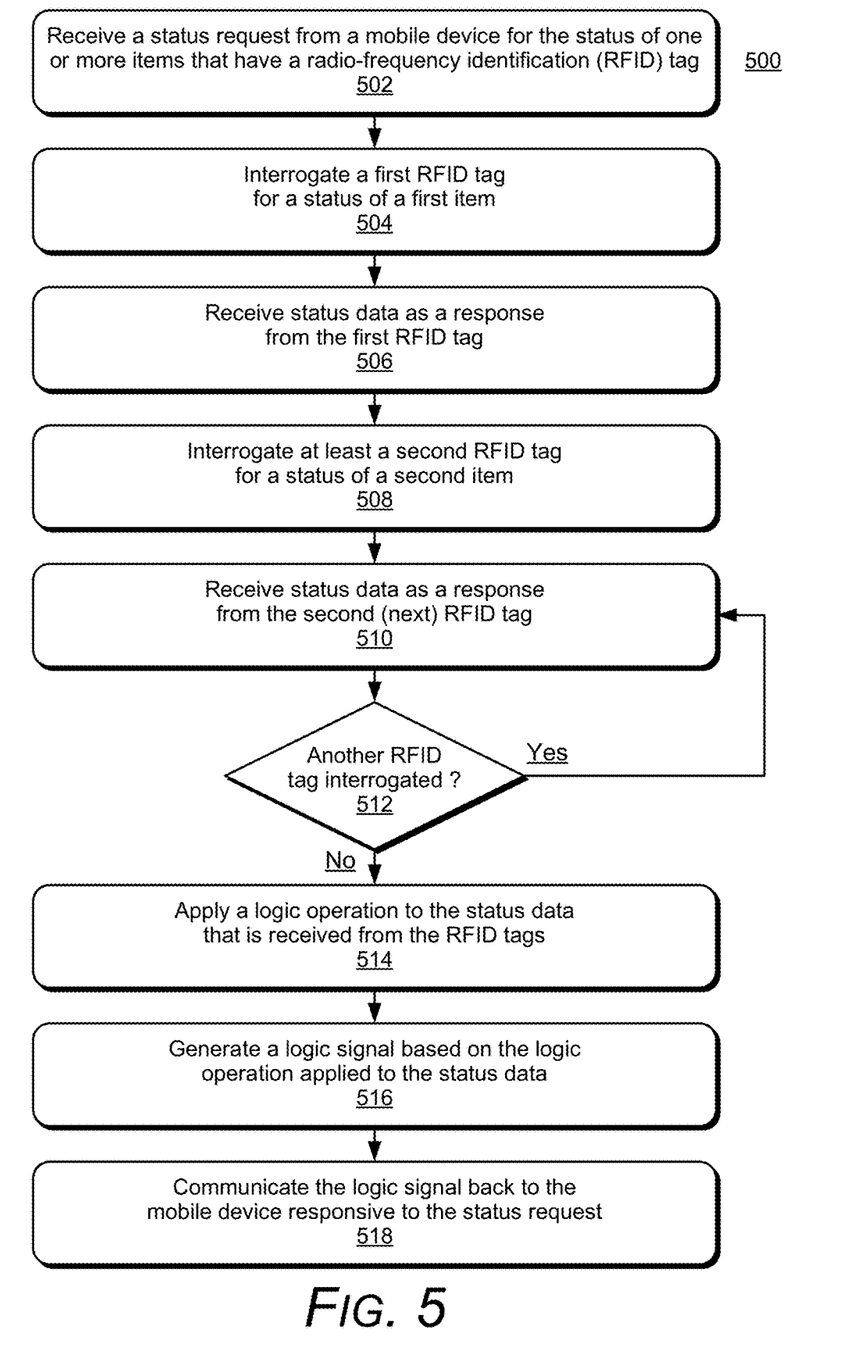
FIG. 5 illustrates example method(s) of an RFID logic tag in accordance with one or more embodiments.

FIG. 5 illustrates example method(s) 500 of an RFID logic tag. The order in which the method is described is not intended to be construed as a limitation, and any number or combination of the described method operations can be performed in any order to perform a method, or an alternate method.

At 502, a status request is received from a mobile device for the status of one or more items that have a radio-frequency identification (RFID) tag. For example, a status request can be initiated from the mobile device 152 for the status of items (e.g., the first item 140 and the second item 144) that each a respective RFID tag (e.g., the first RFID tag 104 and the second RFID tag 106). The first and second RFID tags 104 and 106 are implemented to status a quantity and/or a configuration of the respective first and second items 140 and 144.

At 504, a first RFID tag is interrogated for a status of a first item and, at 506, status data is received as a response from the first RFID tag. For example, the RFID reader 108 of the RFID logic tag 102 initiates the interrogation signal 126 to interrogate the first RFID tag 104 that receives the interrogation signal as a request to provide data or information associated with the monitored item 140. The RFID reader 108 of the RFID logic tag 102 also receives the response 128 from the RFID tag 104, and the response includes the data 130 that is associated with the monitored item 140.

At 508, at least a second RFID tag is interrogated for a status of a second item and, at 510, status data is received as a response from the second (next) RFID tag. For example, the RFID reader 108 of the RFID logic tag 102 initiates the interrogation signal 126 (concurrently at 504) to interrogate the second RFID tag 106 that receives the interrogation signal as a request to provide data or information associated with the monitored item 144. The RFID reader 108 of the RFID logic tag 102 also receives the response 132 from the RFID tag 106, and the response includes the data 134 that is associated with the monitored item 144.

At 512, a determination is made as to whether an additional RFID tag is interrogated for status of an associated item. For example, the RFID reader 108 of the RFID logic tag 102 initiates the interrogation signal 126 (concurrently at 504 and 508) to interrogate one or more additional RFID tags that each receive the interrogation signal as a request to provide data or information associated with a monitored item. If another RFID tag is interrogated for the status of an associated item (i.e., "Yes" from 512), then the method continues at 510 to receive a response from an additional RFID tag, and the response includes the status data that is associated with a monitored item of the RFID tag.

If another RFID tag is not interrogated (i.e., "No" from 512), then at 514, a logic operation is applied to the status data that is received from the RFID tags and, at 516, a logic signal is generated based on the logic operation applied to the status data from the RFID tags. For example, the logic module 148 of the RFID logic tag 102 generates the logic signal 150 based on a logic operation applied to the status data from the first and second RFID tags, as well as the status data from any additional RFID tags. In implementations, the logic operation applied by the logic module 148 may be an AND function of the status data, or may be applied as an OR function of the status data received from the RFID tags.

The logic signal 150 that is generated by the logic module 148 based on an AND function of the status data can indicate that a quantity of the monitored items is available, or is not available. Alternatively, the logic signal 150 that is generated based on an AND function can indicate that a configuration of the monitored items is acceptable, or is not acceptable. Alternatively, the logic signal 150 that is generated by the logic module 148 based on an OR function of the status data can indicate that a quantity of the monitored items is available, or that the quantity of both the monitored items is not available. Alternatively, the logic signal 150 that is generated based on an OR function can indicate that a configuration of the monitored items is acceptable, or that the configuration of the monitored items is not acceptable. The RFID tags (e.g., the first RFID tag 104 and the second RFID tag 106) can be implemented for status monitoring of a quantity of the respective items, and the logic module 148 of the RFID logic tag 102 generates the logic signal 150 as an indication that a quantity of the items at least meets a threshold, or as an indication that the quantity of at least one of the items does not meet the threshold. Alternatively, the RFID tags can be implemented for status monitoring of a configuration of the respective items, and the logic module 148 generates the logic signal 150 as an indication that the configuration of the respective items is acceptable, or as an indication that the configuration of at least one of the items is not acceptable.

At 518, the logic signal is communicated back to the mobile device responsive to the status request. For example, the RFID logic tag 102 operates as a logic gate and communicates the logic signal 150 as a logic one back to the mobile device 152, indicating that a quantity of the respective items at least meets a threshold and/or indicating that a configuration of the respective items is acceptable. Alternatively, the RFID logic tag 102 communicates the logic signal 150 as a logic zero back to the mobile device 152, indicating that a quantity of at least one item does not meet the threshold and/or indicating that the configuration of at least one item is not acceptable.

Although embodiments of an RFID logic tag have been described in language specific to features and/or methods, the subject of the appended claims is not necessarily limited to the specific features or methods described. Rather, the specific features and methods are disclosed as example implementations of an RFID logic tag, and other equivalent features and methods are intended to be within the scope of the appended claims. Further, various different embodiments are described and it is to be appreciated that each described embodiment can be implemented independently or in connection with one or more other described embodiments.

The invention claimed is:

1. A system, comprising:
 a first radio-frequency identification (RFID) tag configured for status monitoring of a first item;
 at least a second RFID tag configured for status monitoring of a second item;
 an RFID logic device configured to:
  initiate an interrogation of the first and second RFID tags;
  receive status data as responses from the respective first and second RFID tags; and
  generate a logic signal based on a logic operation applied to the status data from the first and second RFID tags.

2. The system as recited in claim 1, wherein the RFID logic device is further configured to:
 initiate the interrogation of one or more additional RFID tags;
 receive the status data as responses from the one or more additional RFID tags; and
 generate the logic signal based on the logic operation applied to the status data from the first RFID tag, the second RFID tag, and the one or more additional RFID tags.

3. The system as recited in claim 1, wherein the RFID logic device comprises an RFID logic tag configured to generate the logic signal based on the logic operation that includes one of an AND function of the status data, or an OR function of the status data.

4. The system as recited in claim 1, wherein the RFID logic device is configured to generate the logic signal based on an AND function of the status data, the logic signal indicating that a quantity of the first and second items is available, or is not available.

5. The system as recited in claim 1, wherein the RFID logic device is configured to generate the logic signal based on an AND function of the status data, the logic signal indicating that a configuration of the first and second items is acceptable, or is not acceptable.

6. The system as recited in claim 1, wherein the RFID logic device is configured to generate the logic signal based on an OR function of the status data, the logic signal indicating that a quantity of the first or second items is available, or that the quantity of both the first and second items is not available.

7. The system as recited in claim 1, wherein the RFID logic device is configured to generate the logic signal based on an OR function of the status data, the logic signal indicating that a configuration of the first or second items is acceptable, or that the configuration of both the first and second items is not acceptable.

8. The system as recited in claim 1, wherein the RFID logic device comprises a mobile phone that includes an RFID reader and logic module configured to:
 interrogate the first and second RFID tags;
 receive the status data from the first and second RFID tags; and
 generate the logic signal based on the logic operation.

9. The system as recited in claim 1, wherein:
 the first and second RFID tags are configured for the status monitoring of a quantity of the respective first and second items; and
 the RFID logic device is configured to generate the logic signal as an indication that the quantity of the respective first and second items at least meets a threshold, or as an indication that the quantity of at least one of the first and second items does not meet the threshold.

10. The system as recited in claim 1, wherein:
 the first and second RFID tags are configured for the status monitoring of a configuration of the respective first and second items; and
 the RFID logic device is configured to generate the logic signal as an indication that the configuration of the respective first and second items is acceptable, or as an indication that the configuration of at least one of the first and second items is not acceptable.

11. The system as recited in claim 1, wherein the RFID logic device is configured to:
 receive a status request from a mobile device; and
 communicate the logic signal back to the mobile device responsive to the status request.

12. A method for a logic operation applied by a radio-frequency identification (RFID) logic tag, the method comprising:
 interrogating a first RFID tag for a status of a first item;
 interrogating at least a second RFID tag for a status of a second item;
 receiving status data as responses from the respective first and second RFID tags; and
 generating a logic signal based on a logic operation applied to the status data from the first and second RFID tags.

13. The method as recited in claim 12, further comprising:
 interrogating one or more additional RFID tags;
 receiving the status data as responses from the one or more additional RFID tags; and
 said generating the logic signal based on the logic operation applied to the status data from the first RFID tag, the second RFID tag, and the one or more additional RFID tags.

14. The method as recited in claim 12, further comprising:
 applying the logic operation as one of an AND function of the status data, or an OR function of the status data.

15. The method as recited in claim 12, further comprising:
 receiving a status request from a mobile device; and
 communicating the logic signal back to the mobile device responsive to the status request.

16. The method as recited in claim 12, wherein:
 the first and second RFID tags are configured to status a quantity of the respective first and second items; and
 said generating the logic signal as an indication that the quantity of the respective first and second items at least meets a threshold, or as an indication that the quantity of at least one of the first and second items does not meet the threshold.

17. The method as recited in claim 12, wherein:
 the first and second RFID tags are configured to status a configuration of the respective first and second items; and
 said generating the logic signal as an indication that the configuration of the respective first and second items is acceptable, or as an indication that the configuration of at least one of the first and second items is not acceptable.

18. A radio-frequency identification (RFID) logic device, comprising:
 an RFID reader configured to:
  interrogate a first RFID tag configured for status monitoring of a first item;
  interrogate at least a second RFID tag configured for status monitoring of a second item;
  receive status data as responses from the respective first and second RFID tags; and
 an RFID logic module configured to generate a logic signal based on a logic operation applied to the status data from the first and second RFID tags.

19. The RFID logic device as recited in claim 18, wherein:
 the RFID reader is further configured to:
  interrogate one or more additional RFID tags;
  receive the status data as responses from the one or more additional RFID tags; and
 the RFID logic module is configured to generate the logic signal based on the logic operation applied to the status data from the first RFID tag, the second RFID tag, and the one or more additional RFID tags.

20. The RFID logic device as recited in claim 18, wherein the RFID logic module is configured to generate the logic signal based on the logic operation that includes one of an AND function of the status data, or an OR function of the status data.

* * * * *